US009600186B2

United States Patent
Satou et al.

(10) Patent No.: US 9,600,186 B2
(45) Date of Patent: Mar. 21, 2017

(54) DEVICE AND METHOD FOR CAUSING ANOTHER DEVICE TO EXECUTE WRITE INSTRUCTION ACCORDING TO INDEX VALUE REPRESENTING LOAD

(71) Applicant: FUJITSU LIMITED, Kawasaki-shi, Kanagawa (JP)

(72) Inventors: Akira Satou, Kawasaki (JP); Toshiaki Yamauchi, Numazu (JP); Akihide Otawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/656,316

(22) Filed: Mar. 12, 2015

(65) Prior Publication Data

US 2015/0301753 A1    Oct. 22, 2015

(30) Foreign Application Priority Data

Apr. 16, 2014  (JP) ................. 2014-084787

(51) Int. Cl.
*G06F 12/00* (2006.01)
*G06F 3/06* (2006.01)
*G06F 13/40* (2006.01)

(52) U.S. Cl.
CPC ............ *G06F 3/0613* (2013.01); *G06F 3/067* (2013.01); *G06F 3/0635* (2013.01); *G06F 13/4022* (2013.01)

(58) Field of Classification Search
CPC ...... G06F 3/0613; G06F 3/0635; G06F 3/067; G06F 13/4022
See application file for complete search history.

(56) References Cited

U.S. PATENT DOCUMENTS

| | | | | | |
|---|---|---|---|---|---|
| 4,633,387 | A | * | 12/1986 | Hartung | G06F 12/0866 711/E12.019 |
| 6,067,545 | A | * | 5/2000 | Wolff | H04L 67/1008 |
| 6,108,684 | A | * | 8/2000 | DeKoning | G06F 9/505 718/100 |
| 8,621,178 | B1 | * | 12/2013 | Lazar | G06F 12/0223 711/117 |
| 2006/0112247 | A1 | | 5/2006 | Ramany et al. | |
| 2011/0078334 | A1 | | 3/2011 | Arakawa et al. | |
| 2012/0317311 | A1 | | 12/2012 | Arakawa et al. | |

FOREIGN PATENT DOCUMENTS

JP    2008-521140    6/2008
JP    2011-076582    4/2011

* cited by examiner

*Primary Examiner* — Larry MacKall
(74) *Attorney, Agent, or Firm* — Staas & Halsey LLP (57) ABSTRACT

A first storage virtualization device operates in a system in which instructions requested by host computers are assigned to a plurality of storage virtualization devices. The first storage virtualization device includes an interface and a processor. The interface receives a write instruction assigned to the first storage virtualization device, data to be written by the write instruction, and operation statuses of other storage virtualization devices in the system. The processor calculates index values which represent loads when the first storage virtualization device processes the write instruction. The processor selects a second storage virtualization device for the purpose of requesting that it execute the write instruction by use of the operation statuses when the index values are greater than thresholds. The processor transmits the write instruction and the data to the second storage virtualization device.

12 Claims, 6 Drawing Sheets

DEVICE AND METHOD FOR CAUSING ANOTHER DEVICE TO EXECUTE WRITE INSTRUCTION ACCORDING TO INDEX VALUE REPRESENTING LOAD

CROSS-REFERENCE TO RELATED APPLICATION

This application is based upon and claims the benefit of priority of the prior Japanese Patent Application No. 2014-084787, filed on Apr. 16, 2014, the entire contents of which are incorporated herein by reference.

FIELD

The embodiments discussed herein relate to a storage system.

BACKGROUND

A storage system includes a plurality of host computers, a plurality of fiber channel switches (FC switches), a plurality of physical storage devices, and a plurality of storage virtualization devices, for example. A host computer outputs an instruction to write data to a storage virtualization device. The host computer is connected to a fiber channel switch, and the instruction that is output by the host computer is reported to the fiber channel switch. The fiber channel switch is connected to a plurality of storage virtualization devices. The fiber channel switch transmits the received instruction to one of the plurality of storage virtualization devices. Each of the storage virtualization devices operates as a virtual storage device in combination with some or all storage areas in a plurality of physical storage devices. Each of the storage virtualization devices provides a virtual storage device accessible by the host computers. After being accessed by the host computer, the storage virtualization device accesses the storage area in the physical storage device which corresponds to an access area in the storage virtualization device.

A concentration of accesses on one storage virtualization device is not desirable in a storage system since this causes a delay in processing. Thus, for example, a fiber channel switch assigns accesses from host computers in a round robin manner to a plurality of storage virtualization devices. The accesses are not concentrated on one storage virtualization device because of the round robin assignment.

As a technology on a fiber channel switch, there exists a technology which permits associating of a virtual port with a plurality of physical ports in a fiber channel switch so as to control the virtual port as a transmission destination (see Patent Document 1, for example).

As a technology relating to load-balancing, a technology exists which permits collecting of various pieces of performance data in physical storage devices and computing of a set of overall metrics so as to load balance between the physical storage devices (see Patent Document 2, for example).

Patent Document 1: Japanese Laid-open Patent Publication No. 2011-76582
Patent Document 2: Japanese National Publication of International Patent Application No. 2008-521140

SUMMARY

A first storage virtualization device operates in a system in which instructions requested by host computers are assigned to a plurality of storage virtualization devices. An interface receives a write instruction assigned to the first storage virtualization device, data to be written by the write instruction, and operation statuses of other storage virtualization devices in the system. A processor calculates index values which represent loads when the first storage virtualization device processes the write instruction. The processor selects a second storage virtualization device for the purpose of requesting that it execute the write instruction by use of the operation statuses when the index values are greater than thresholds. The processor transmits the write instruction and the data to the second storage virtualization device.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Performances of physical storage devices equipped in a storage system are not uniformly the same. There has been a problem wherein a storage virtualization device which communicates with a physical storage device whose speed of processing is slow processes more slowly than other storage virtualization devices.

In accordance with an aspect of the present invention, an object of the present invention is to reduce a difference in a speed of processing between storage virtualization devices.

Embodiments of the present invention will now be described in detail with reference to the drawings.

Figure 1:
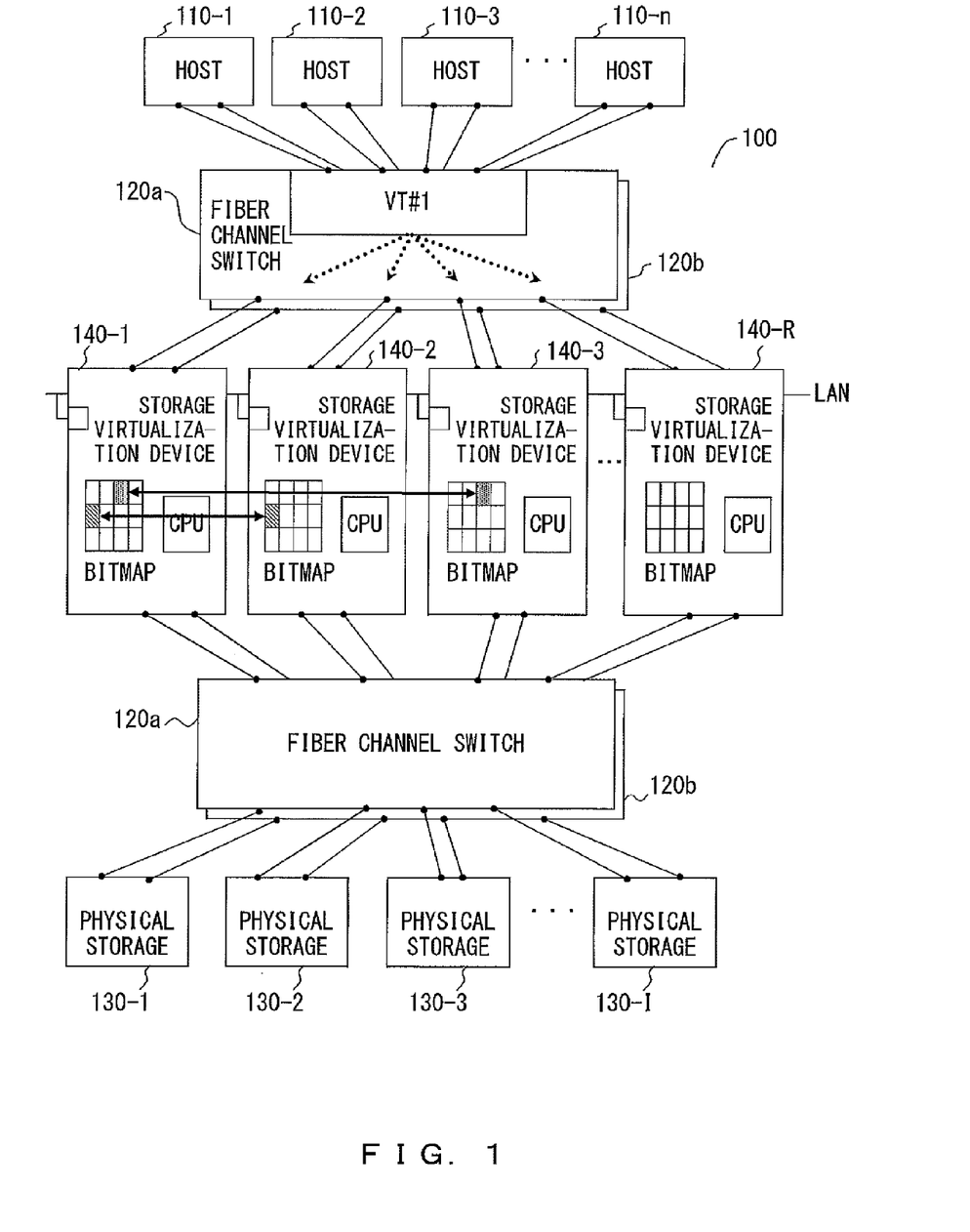
FIG. 1 is an example of a storage system according to an embodiment of the present invention.

FIG. 1 is an example of a storage system according to an embodiment of the present invention. A storage system 100 includes a host computer 110, fiber channel switches 120 (120a and 120b), a physical storage device 130, and a storage virtualization device 140. In the example in FIG. 1, the storage system 100 includes a plurality of host computers 110-1 to 110-n. In the example in FIG. 1, the system 100 also includes a plurality of physical storage devices 130 (130-1 to 130-I) and a plurality of storage virtualization devices 140 (140-1 to 140-R). The number of the host computers, the storage virtualization devices, and the physical storage devices are not limited.

The host computer 110 is connected to the fiber channel switches 120. The host computer 110 outputs an instruction to the fiber channel switches 120 to write data to a storage virtualization device 140 and data to be written to the storage virtualization device 140. The fiber channel switches 120 are connected to the storage virtualization devices 140. The fiber channel switches 120 receive the instruction output by the host computer 110. The fiber channel switches 120 select a storage virtualization device 140 in a round robin manner and transmit the received instruction to the selected storage virtualization device 140. In other words, the fiber channel switches 120 are an adjuster which makes an adjustment so that a plurality of storage virtualization devices 140 in the storage system have an equal number of times that the instructions issued by the host computers 110 are processed.

Each of the storage virtualization devices 140 includes a CPU (central processing unit), a memory, a bitmap, and an interface. The bitmap is management information in which a cache area of the storage virtualization device 140 is divided into a plurality of areas and bits are associated for each divided area. For example, the bitmap manages whether or not the data has been written by use of on/off states of the bits. The bit being in an on state indicates that the data stored in the storage virtualization device 140 has not been written to the physical storage device. On the other hand, the bit being in an off state indicates that the data stored in the storage virtualization device 140 has been written to the physical storage device.

Figure 2:
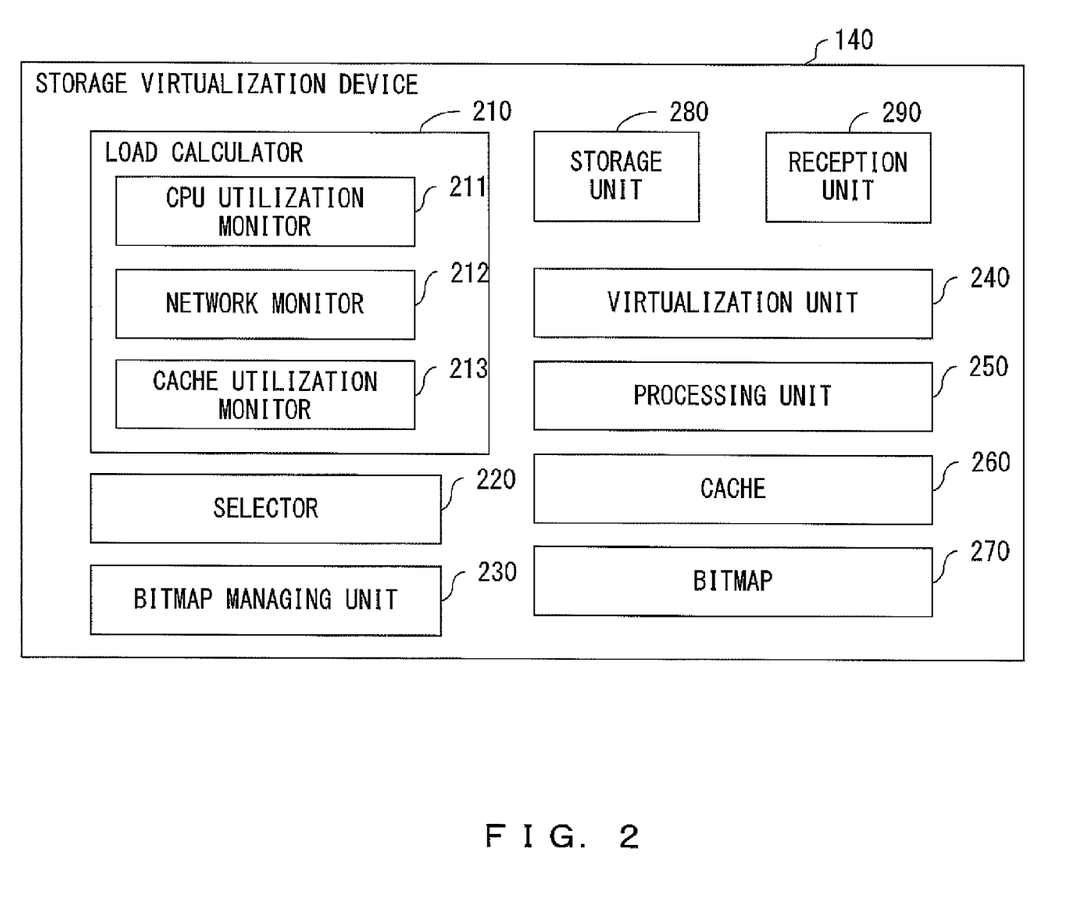
FIG. 2 is a configurative example of a storage virtualization device.

Next is a detailed description of the storage virtualization device. FIG. 2 is a configurative example of a storage virtualization device. The storage virtualization device 140 includes a load calculator 210, a selector 220, a bitmap managing unit 230, a virtualization unit 240, a processing unit 250, and a reception unit 290. Further, the storage virtualization device 140 includes a cache 260, a bitmap 270, and a storage unit 280. Each of the processes executed in the load calculator 210, the selector 220, the bitmap managing unit 230, the virtualization unit 240, and the processing unit 250 is performed by the CPU. The reception unit 290 is an interface. The virtualization unit 240 combines with some or all of storage areas of a plurality of physical storage devices so as to operate the storage virtualization device as a virtual storage device. The reception unit 290 receives one or more instructions generated in the host computer 110 to write to the storage virtualization device 140 and data to be written by the write instructions.

The load calculator 210 includes a CPU utilization monitor 211, a network monitor 212, and a cache utilization monitor 213. The CPU utilization monitor 211 monitors a CPU utilization of the storage virtualization device. The network monitor 212 monitors a load on a network between the storage virtualization devices and the physical storage devices. The load on the network monitored by the network monitor 212 is, for example, an amount of data to be written to the physical storage device by the storage virtualization device. The cache utilization monitor 213 monitors a cache utilization in the storage virtualization device. The load calculator 210 calculates index values which represent loads on the storage virtualization device. The index values which represent loads on the storage virtualization device are data such as a CPU utilization, information on a load on a network, and a cache utilization. Further, the load calculator 210 permits the index values which represent loads on the storage virtualization device to be regularly shared by all the storage virtualization devices 140. Sharing of the index values which represent loads on the storage virtualization device between all the storage virtualization devices 140 permits sharing of operation statuses of other storage virtualization devices. The load calculator 210 may collect the information on a load on the network from the fiber channel switches 120 which are connected between the storage virtualization devices 140 and the physical storage devices 130.

The storage unit 280 stores thereon the index values shared between all the storage virtualization devices 140 which represent loads on each of the storage virtualization devices, as being associated with identifiers of the storage virtualization devices 140 as a sharing source. When a CPU utilization or a value representing a load on the network upon receiving of a write instruction is greater than their predetermined thresholds, the selector 220 selects a storage virtualization device whose CPU utilization and value which represents a load on the network are low. On the other hand, when the CPU utilization and the value representing a load on the network upon receiving of the write instruction are not greater than their predetermined thresholds, the selector 220 selects a storage virtualization device whose cache utilization is low. The bitmap managing unit 230 manages on/off states of each bit in the bitmap 270. The processing unit 250 receives the write instruction and performs write processing to the physical storage device. The storage unit 280, the bitmap 270, and the cache 260 are realized by the memory.

An example of processing in a storage virtualization device 140 according to the embodiment of the present invention will now be described. In the storage system 100 in FIG. 1, a storage virtualization device 140-1 receives an instruction from the fiber channel switches 120.

(1) A reception unit 290 in the storage virtualization device 140-1 receives a write instruction issued by the host computer 110 from the fiber channel switches 120.

(2) A processing unit 250 in the storage virtualization device 140-1 stores data to be written to the physical storage device 130 in a cache. A bitmap managing unit 230 in the storage virtualization device 140-1 turns on a bit in a bitmap in the storage virtualization device 140-1 which corresponds to an area of the physical storage device to be written to.

(3) A load calculator 210 in the storage virtualization device 140-1 collects CPU utilizations and information on a load on the network in all the storage virtualization devices 140 (140-1 to 140-R). The value which represents a load on the network is, for example, an amount of data written by the storage virtualization device. Each of the storage virtualization devices 140 (140-1 to 140-R) measures a CPU utilization and a cache utilization. Each of the storage virtualization devices 140 (140-1 to 140-R) also monitors a load on the network with the connected physical storage devices 130. Further, the load calculator 210 in the storage virtualization device 140-1 calculates index values which represent loads on the storage virtualization device. The index values which represent loads on the storage virtualization device are data such as a CPU utilization, information on a load on a network, and a cache utilization.

The fiber channel switches 120 make an adjustment so that a plurality of storage virtualization devices 140 in the storage system have an equal number of times that the instructions issued by the host computers 110 are processed. However, an amount of processing by the write instructions issued by the host computers 110 is not taken into consideration in the fiber channel switches 120. In addition, a difference in a response time between the physical storage devices is also not taken into consideration in the fiber channel switches 120. Thus, the storage virtualization devices according to the embodiment of the present invention perform processes (4) and (5) in order to take into consideration the amount of processing by the write instructions issued by the host computers 110 and the difference in a performance between the physical storage devices.

(4) A selector 220 in the storage virtualization device 140-1 determines whether or not its CPU utilization is greater than a first threshold. As a first threshold, a CPU utilization which has an effect on a speed of write processing to a physical storage device by the storage virtualization device 140-1 may be used.

(5) The selector 220 in the storage virtualization device 140-1 determines whether or not the value which represents a load on the network is greater than a second threshold. As a second threshold, a value representing a load on the network which has an effect on the speed of write processing to the physical storage device by the storage virtualization device 140-1 may be used. Processes (4) and (5) may be performed in an inverted order or in parallel.

As a result of the determinations in (4) and (5), when the CPU utilization or the value representing a load on the network is greater than their predetermined thresholds, the storage virtualization device 140 performs processes (A6) to (A13).

(A6) The selector 220 in the storage virtualization device 140-1 selects a storage virtualization device 140 which executes, on behalf of the storage virtualization device 140-1, the write instruction received by the storage virtualization device 140-1 itself. In this case, as a storage virtualization device to be requested to perform the execution, the selector 220 selects a storage virtualization device whose CPU utilization and value which represents a load on the network are low. In other words, for a storage virtualization device to be selected by the selector 220, a storage virtualization device which has a lower CPU utilization and a lower value that represents a load on the network is more likely to be selected. As an example, a storage virtualization device 140-2 whose CPU utilization and value that represents a load on the network are low is selected.

(A7) The processing unit 250 in the storage virtualization device 140-1 transmits to the storage virtualization device 140-2 the data to be written to the physical storage device 130. The storage virtualization device 140-2 stores the received data to be written in a cache.

(A8) A bitmap managing unit 230 in the storage virtualization device 140-2 turns on a bit in a bitmap in the storage virtualization device 140-2 which corresponds to the physical storage device to be written to. If the bit in the bitmap is turned on, the storage virtualization device 140-2 is put on standby for write processing.

(A9) A processing unit 250 in the storage virtualization device 140-2 reports to the host computer 110 that gave the write instruction that the write processing has been completed.

(A10) The processing unit 250 in the storage virtualization device 140-1 transfers the write instruction issued by the host computer 110 to the storage virtualization device 140-2.

(A11) When it receives the write instruction, the processing unit 250 in the storage virtualization device 140-2 performs the write processing to the physical storage device 130.

(A12) The bitmap managing unit 230 in the storage virtualization device 140-2 turns off the bit in the bitmap which corresponds to the physical storage device to be written to. The processing unit 250 in the storage virtualization device 140-2 reports to the storage virtualization device 140-1 that the write processing has been completed.

(A13) The bitmap managing unit 230 in the storage virtualization device 140-1 turns off the bit in the bitmap which corresponds to the physical storage device to be written to.

In processes (A6) to (A13), the storage virtualization device 140-1 does not perform by itself the write processing to the physical storage device which it received from the fiber channel switches 120. Thus, loads on the storage virtualization device 140-1 do not increase. If the storage virtualization device 140-2 whose loads are relatively low performs the write processing on behalf of the storage virtualization device 140-1, a difference in loads between the storage virtualization devices 140 which is caused by the amount of processing and the difference in a speed of processing between the physical storage devices is reduced.

On the other hand, as a result of the determinations in (4) and (5), when the CPU utilization and the value representing a load on the network are not greater than their predetermined thresholds, the storage virtualization device 140 performs the processes represented in (B6) to (B13). In this case, the storage virtualization device 140 performs by itself the write processing to the physical storage device that it received from the fiber channel switches 120.

(B6) The load calculator 210 in the storage virtualization device 140-1 collects information on cache utilizations in all the storage virtualization devices 140 (140-1 to 140-R).

(B7) The selector 220 in the storage virtualization device 140-1 selects a storage virtualization device whose cache utilization is low as a sharing destination for the data to be written. A storage virtualization device 140 which has a lower cache utilization is more likely to be selected. As an example of the process (B7), a storage virtualization device 140-3 whose cache utilization is low is selected.

(B8) The processing unit 250 in the storage virtualization device 140-1 transmits to the storage virtualization device 140-3 the data to be written to the physical storage device 130. A processing unit 250 in the storage virtualization device 140-3 stores the received data in a cache.

(B9) A bitmap managing unit 230 in the storage virtualization device 140-3 turns on a bit in a bitmap in the storage virtualization device 140-3 which corresponds to the physical storage device to be written to.

(B10) The processing unit 250 in the storage virtualization device 140-1 reports to the host computer 110 which gave the write instruction that the write processing has been completed.

(B11) The processing unit 250 in the storage virtualization device 140-1 performs the write processing to the physical storage device 130.

(B12) The bitmap managing unit 230 in the storage virtualization device 140-1 turns off the bit in the bitmap which corresponds to the physical storage device to be written to. The processing unit 250 in the storage virtualization device 140-1 reports to the storage virtualization device 140-3 that the write processing has been completed.

(B13) The bitmap managing unit 230 in the storage virtualization device 140-3 turns off the bit in the bitmap which corresponds to the physical storage device to be written to.

As described above, when the CPU utilization or the value representing a load on the network is greater than their predetermined thresholds, the processing in the storage virtualization device whose speed of processing is slow can be passed to a storage virtualization device whose speed of processing is fast by performing processes (A6) to (A12).

Figure 3:
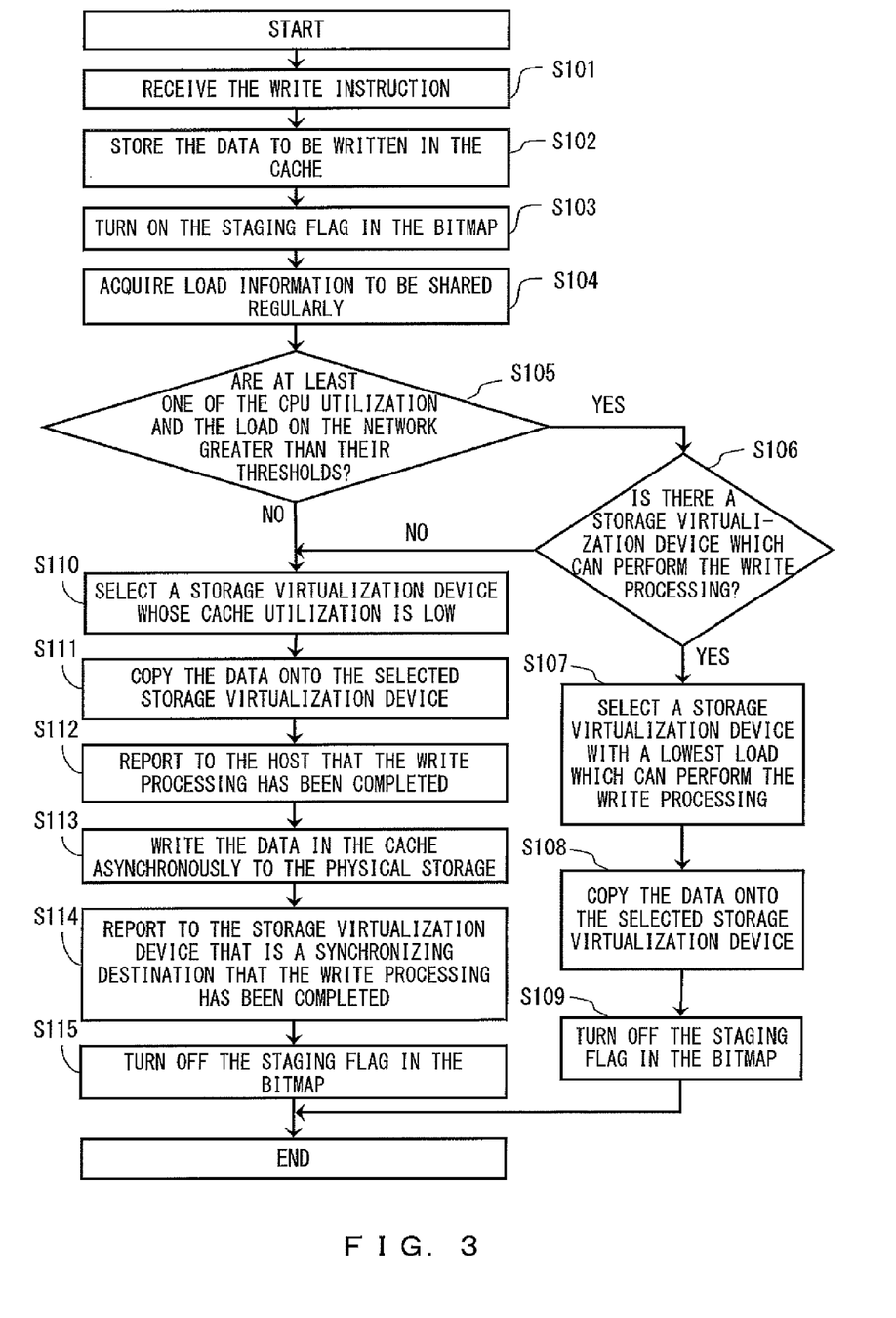
FIG. 3 is a flowchart of an example of processing in a storage virtualization device which has received a write instruction.

FIG. 3 is a flowchart of an example of processing in a storage virtualization device which has received a write instruction. The reception unit 290 receives the write instruction issued by the host computer 110 via the fiber channel switches 120 (Step S101). The processing unit 250 stores the data to be written to the physical storage devices 130 in the cache (Step S102). The bitmap managing unit 230 turns on the bit in the bitmap which corresponds to the physical storage device to be written to (Step S103). The load calculator 210 collects the CPU utilizations and the information on a load on the network in all the storage virtualization devices 140 (140-1 to 140-R). Further, the load calculator 210 calculates index values which represent loads on the storage virtualization device (Step S104). The load calculator determines whether or not its CPU utilization is greater than the first threshold. Further, the load calculator 210 determines whether or not the value which represents a load on the network is greater than the second threshold (Step S105).

When at least one of the CPU utilization and the value representing a load on the network are greater than their predetermined thresholds, the selector 220 determines whether or not there is a storage virtualization device which can perform the write processing (Step S106, YES at Step S105). The selector 220 selects a storage virtualization device whose CPU utilization and value which represents a load on the network are low (Step S107, YES at Step S106). The processing unit 250 transmits the data to be written and the write instruction to the storage virtualization device which has been selected by the selector 220 (Step S108). When the storage virtualization device which has been selected by the selector 220 performs the write processing to the physical storage device and receives a report that the write processing to the physical storage device has been completed, the bitmap managing unit 230 turns off the bit in the bitmap which corresponds to the physical storage device to be written to (Step S109).

On the other hand, when both CPU utilization and information on a load on the network are equal to or less than their thresholds, the load calculator 210 collects the information on the cache utilizations in all the storage virtualization devices 140. The selector 220 selects a storage virtualization device whose cache utilization is low from among all the storage virtualization devices 140 (Step S110, NO at Step S105, NO at Step S106). The processing unit 250 transmits the data to be written to the storage virtualization device which has been selected by the selector 220 (Step S111). The processing unit 250 reports to the host computer 110 which gave the write instruction that the write processing has been completed (Step S112). The processing unit 250 performs the write processing to the physical storage device 130 (Step S113). The processing unit 250 reports to the storage virtualization device 140 that is a sharing destination for the data to be written that the write processing has been completed (Step S114). The bitmap managing unit 230 turns off the bit in the bitmap which corresponds to the physical storage device to be written to (Step S115). When Step S109 or S115 ends, the storage virtualization device which received the write instruction ends the write processing.

Figure 4A:
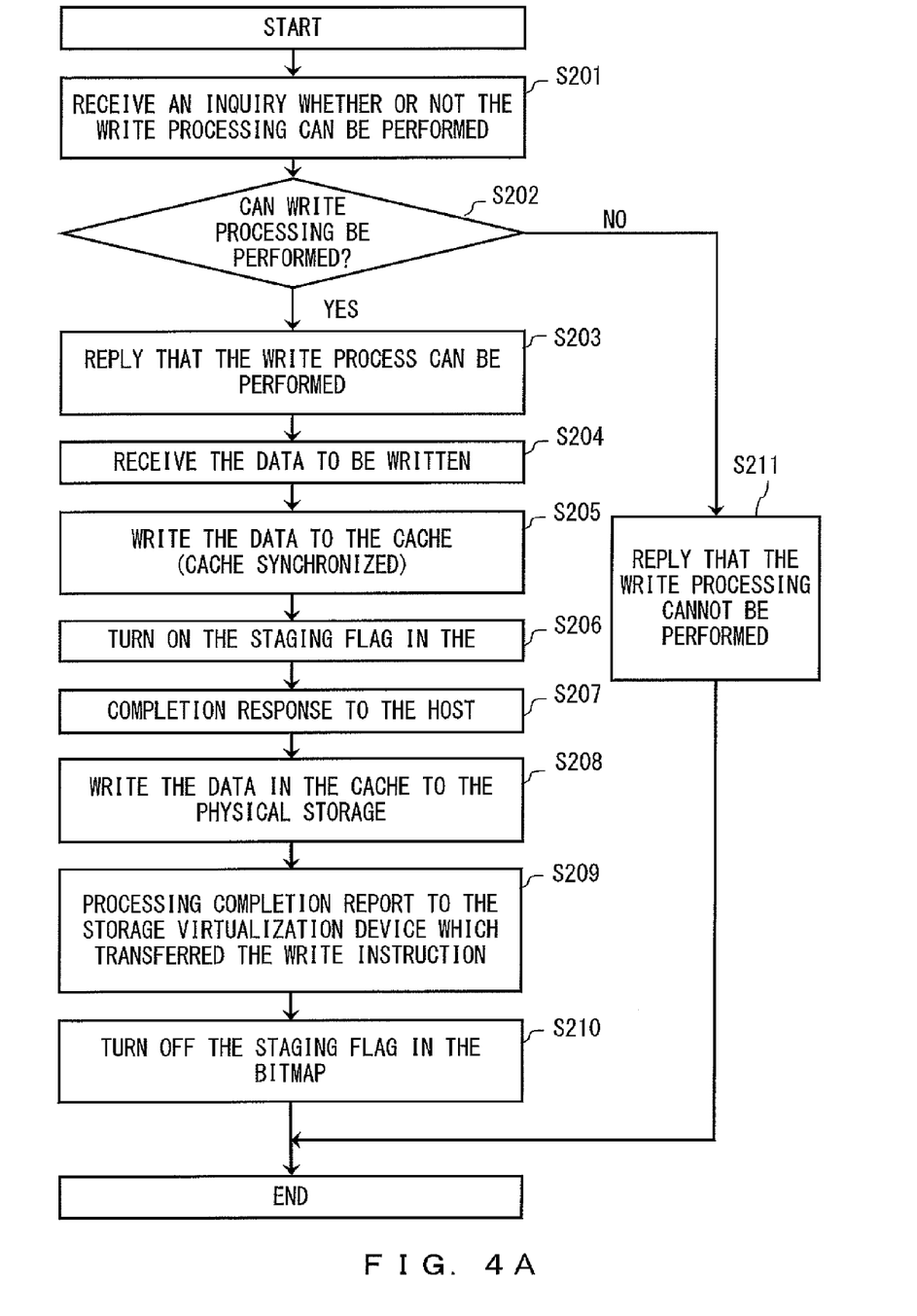
FIG. 4A is a flowchart of an example of processing in a storage virtualization device which has been selected by a selector.

FIG. 4A is a flowchart of an example of processing in a storage virtualization device which has been selected by a selector. FIG. 4A is an example of processing in a storage virtualization device which performs processing of other storage virtualization devices 140 on their behalf as a result of having been selected as a storage virtualization device whose CPU utilization and value which represents a load on a network are low. The processing unit 250 receives an inquiry to confirm whether or not the write processing can be performed (Step S201). The inquiry received at S201 corresponds to the inquiry that was given at Step S106 in the storage virtualization device 140 that makes a request to perform a proxy process of the write processing. The selector 220 determines whether or not the write processing can be dealt with by use of a comparative result of the CPU utilization and the first threshold and that of the load on the network and the second threshold (Step S202). The processing unit 250 reports to the storage virtualization device 140 that makes a request to perform the proxy process of the write processing that the write processing can be performed (Step S203, YES at Step S202). The reception unit 290 receives the data to be written from the storage virtualization device which received the write instruction (Step S204). The data to be written received at S204 corresponds to the data to be written which was transmitted at Step S108 in the storage virtualization device 140 that makes a request to perform the proxy process of the write processing. The processing unit 250 stores the received data in the cache (Step S205). The bitmap managing unit 230 turns on the bit in the bitmap which corresponds to the physical storage device to be written to (Step S206). The processing unit 250 reports to the host computer 110 which gave the write instruction that the write processing has been completed (Step S207).

The processing unit 250 performs the write processing to the physical storage device 130 (Step S208). The processing unit 250 reports to the storage virtualization device which received the write instruction that the write processing has been completed (Step S209). The bitmap managing unit 230 turns off the bit in the bitmap which corresponds to the physical storage device to be written to (Step S210). The processing unit 250 reports to the storage virtualization device 140 that makes a request to perform the proxy process of the write processing that the write processing cannot be performed (Step S211, NO at Step S202). When Step S211 or S210 ends, the storage virtualization device ends the write processing.

Figure 4B:
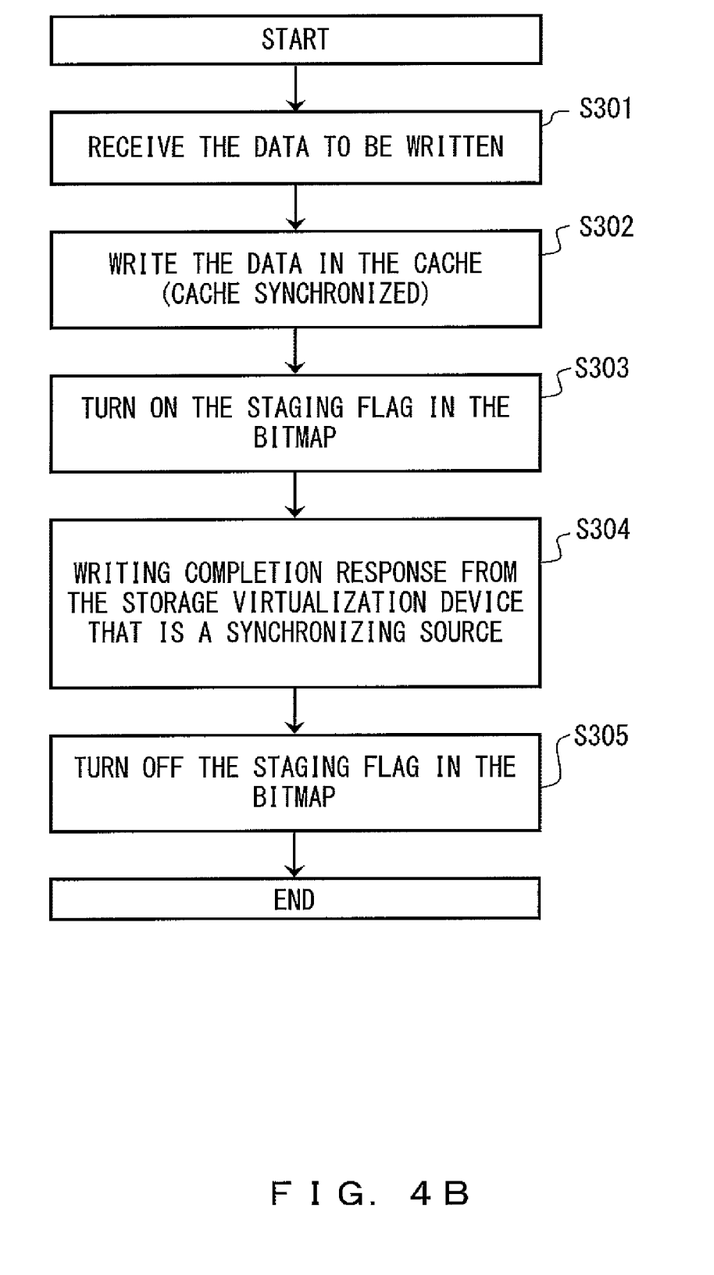
FIG. 4B is a flowchart of an example of processing when a storage virtualization device which has been selected by a selector is a sharing destination for data which is being written.

FIG. 4B is a flowchart of an example of processing when a storage virtualization device which has been selected by a selector is a sharing destination for data which is being written. The reception unit 290 receives the data to be written from the storage virtualization device which received the write instruction from the host computer. (Step S301, corresponding to Step S111). The processing unit 250 stores the received data in the cache (Step S302). The bitmap managing unit 230 turns on the bit in the bitmap which corresponds to the physical storage device to be written to (Step S303). The reception unit 290 receives a report from the storage virtualization device which received the write instruction that the write processing has been completed (Step S304, corresponding to Step S114). The bitmap managing unit 230 turns off the bit in the bitmap which corresponds to the physical storage device to be written to (Step S305). When Step S305 ends, the storage virtualization device ends the processing.

Figure 5:
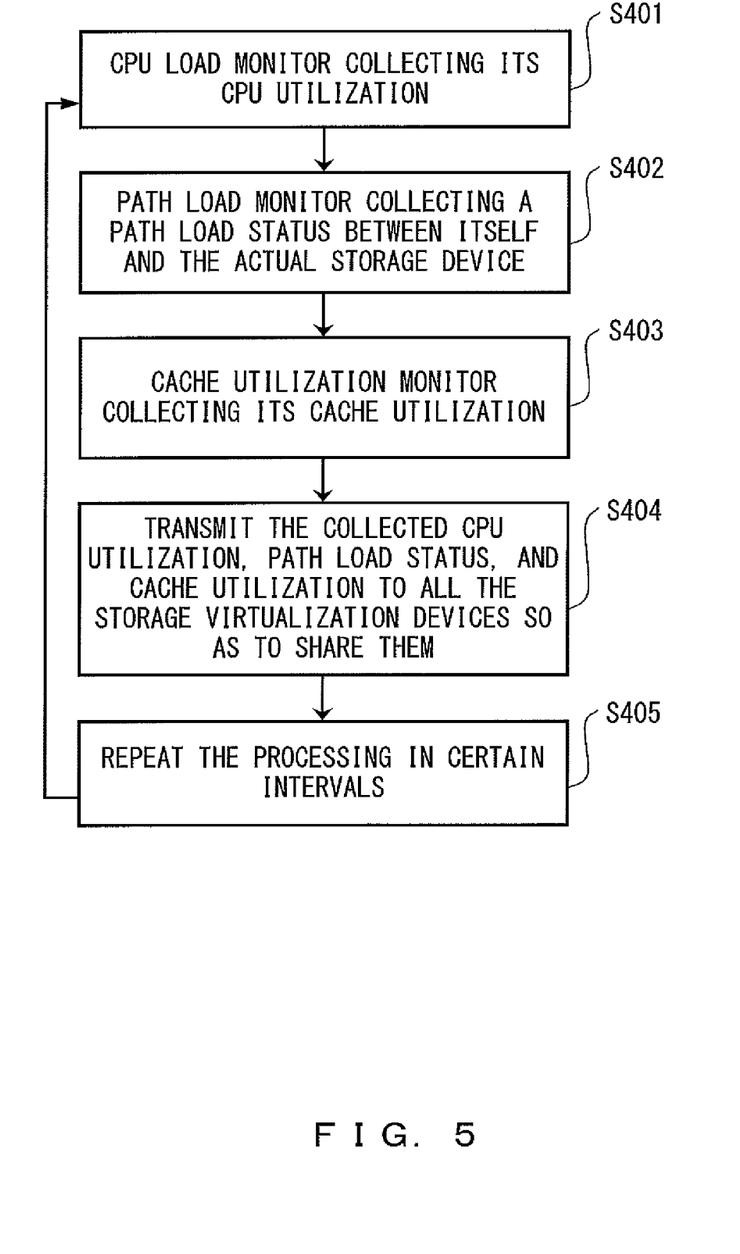
FIG. 5 is a flowchart of an example of processing of load information collection in a storage virtualization device.

FIG. 5 is a flowchart of an example of processing of a load information collection in a storage virtualization device. The processing of a load information collection is performed in all the storage virtualization devices in the system. The CPU utilization monitor 211 collects the information on the CPU utilization (Step S401). The network monitor 212 collects the amount of the data which is written to the physical storage device by the storage virtualization device (Step S402). The cache utilization monitor 213 collects the information on the cache utilization (Step S403). The load calculator 210 calculates index values which represent loads on the storage virtualization device, that is, data such as a CPU utilization, information on a load on a network, and a cache utilization, and transmits them to all the storage virtualization devices (Step S404). The processing unit 250 waits on standby for a certain amount of time, and returns the process to S401.

As described above, in a method according to the embodiment of the present invention, the processing in the storage virtualization device whose speed of processing is slow can be passed to a storage virtualization device whose speed of processing is fast because the CPU utilization or the value which represents a load on the network is greater than their predetermined thresholds.

Others

The storage system according to the embodiment of the present invention can also determine whether or not the storage system is to be expanded by use of the CPU utilizations and the information on a load on the network in all the storage virtualization devices 140. Any of the storage virtualization devices can report a request to expand the system to a management terminal if it is in at least one of a state in which the CPU utilization is greater than the first threshold and a state in which the load on the network is greater than the second threshold. In this case, the entire storage system is in a consistently overloaded state. In other words, the storage virtualization device becomes a bottleneck, which results in a decreased function in the entire storage system. The management terminal is connected to one of the storage virtualization devices 140 so as to manage all the storage virtualization devices 140. The storage system may not include an adjuster in the system itself.

The load calculator 210 regularly calculates averages of the CPU utilizations and of the values which represent the load information on the network in all the storage virtualization devices. The load calculator 210 calculates the averages every hour, for example. The load calculator 210 determines that the entire storage system is in an overloaded state when the calculated averages are continually greater than the predetermined thresholds a certain number of times.

All examples and conditional language provided herein are intended for the pedagogical purpose of aiding the reader in understanding the invention and the concepts contributed by the inventor to further the art, and are not to be construed as limitations to such specifically recited examples and conditions, nor does the organization of such examples in the specification related to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage virtualization device which operates as a first storage virtualization device in a system in which instructions requested by host computers are assigned to a plurality of storage virtualization devices, the first storage virtualization device comprising:
    an interface configured to receive a write instruction assigned to the first storage virtualization device, data to be written by the write instruction, values representing Central Processing Unit (CPU) utilizations of other storage virtualization devices in the system or loads on networks connected to the other storage virtualization devices, and cache utilizations of the other storage virtualization devices; and
    a processor configured to calculate an index value representing a CPU utilization of the processor or load on a network connected to the first storage virtualization device when the first storage virtualization device processes the write instruction,
    to select a second storage virtualization device to request to execute the write instruction by use of the values representing the CPU utilizations or the loads on networks when the index value is greater than a threshold value,
    to select the second storage virtualization device to request to execute the write instruction by use of the cache utilizations when the index value is not greater than the threshold value, and
    to transmit the write instruction and the data to the second storage virtualization device.

2. The storage virtualization device according to claim 1, wherein the processor makes a selection so that a storage virtualization device in a lower operation status is more likely to be selected from among other storage virtualization devices in the system.

3. The storage virtualization device according to claim 1, wherein when the index values obtained in the first storage virtualization device are equal to or less than the threshold value, the processor stores the data in a physical storage device which is accessed by the first storage virtualization device, so as to process the write instruction.

4. The storage virtualization device according to claim 1, wherein the index values are an amount of processing required to process an instruction being executed by the processor and an amount of data transmitted and received between the first storage virtualization device and the physical storage device which is accessed by the first storage virtualization device.

5. A method for controlling a storage virtualization device which operates as a first storage virtualization device in a system in which instructions requested by host computers are assigned to a plurality of storage virtualization devices, the method comprising:
    receiving a write instruction assigned to the first storage virtualization device, data to be written by the write instruction, values representing Central Processing Unit (CPU) utilizations of other storage virtualization devices in the system or loads on networks connected to the other storage virtualization devices, and cache utilizations of the other storage virtualization devices;
    calculating an index value representing a CPU utilization of the first storage virtualization device or load on a network connected to the first storage virtualization device when the first storage virtualization device processes the write instruction;
    selecting a second storage virtualization device to request to execute the write instruction by use of the values representing the CPU utilizations or the loads on networks when the index value is greater than a threshold value;
    selecting the second storage virtualization device to request to execute the write instruction by use of the cache utilizations when the index value is not greater than the threshold value; and
    transmitting the write instruction and the data to the second storage virtualization device.

6. The method according to claim 5, wherein a selection is made so that a storage virtualization device in a lower operation status is more likely to be selected from among other storage virtualization devices in the system.

7. The method according to claim 5, wherein when the index values obtained in the first storage virtualization device are equal to or less than the threshold value, the first storage virtualization device stores the data in a physical storage device which is accessed by the first storage virtualization device so as to process the write instruction.

8. The method according to claim 5, wherein the index values are an amount of processing required to process an instruction being executed by a processor and an amount of data transmitted and received between the first storage virtualization device and the physical storage device which is accessed by the first storage virtualization device.

9. A non-transitory computer-readable recording medium having stored therein a control program that causes a storage virtualization device which operates as a first storage virtualization device in a system in which instructions requested by host computers are assigned to a plurality of storage virtualization devices, to perform processing comprising:

receiving a write instruction assigned to the first storage virtualization device, data to be written by the write instruction, values representing Central Processing Unit (CPU) utilizations of other storage virtualization devices in the system or loads on networks connected to the other storage virtualization devices, and cache utilizations of the other storage virtualization devices;

calculating an index value representing a CPU utilization of the first storage virtualization device or load on a network connected to the first storage virtualization device when the first storage virtualization device processes the write instruction;

selecting a second storage virtualization device to request to execute the write instruction by use of the values representing the CPU utilizations or the loads on networks when the index value is greater than a threshold value;

selecting the second storage virtualization device to request to execute the write instruction by use of the cache utilizations when the index value is not greater than the threshold value; and transmitting the write instruction and the data to the second storage virtualization device.

10. The non-transitory computer-readable recording medium having stored therein the control program according to claim 9, wherein the program causes the first storage virtualization device to perform processing of making a selection so that a storage virtualization device in a lower operation status is more likely to be selected from among other storage virtualization devices in the system.

11. The non-transitory computer-readable recording medium having stored therein the control program according to claim 9, wherein the program causes the first storage virtualization device to perform processing of storing the data in a physical storage device which is accessed by the first storage virtualization device when the index values obtained in the first storage virtualization device are equal to or less than the threshold value, so as to process the write instruction.

12. The non-transitory computer-readable recording medium having stored therein the control program according to claim 9, wherein the index values are an amount of processing required to process an instruction being executed by a processor and an amount of data transmitted and received between the first storage virtualization device and the physical storage device which is accessed by the first storage virtualization device.

* * * * *